United States Patent [19]

Jamrog

[11] Patent Number: 5,320,147

[45] Date of Patent: Jun. 14, 1994

[54] FUEL FILLER PIPE FILL CONTROL MODULE

[75] Inventor: James R. Jamrog, Novi, Mich.

[73] Assignee: Ford Motor Company, Dearborn, Mich.

[21] Appl. No.: 57,384

[22] Filed: May 6, 1993

[51] Int. Cl.$^5$ .............................. B65B 31/06
[52] U.S. Cl. ...................... 141/312; 141/44; 141/46; 141/59; 220/86.1; 137/588
[58] Field of Search ................. 141/44–46, 141/59, 302, 301, 312; 220/86.1, 86.2, 89.1; 137/587–589

[56] References Cited

U.S. PATENT DOCUMENTS

| | | |
|---|---|---|
| 3,612,338 | 10/1971 | Ekman . |
| 3,903,942 | 9/1975 | Vest .................................. 141/301 |
| 4,185,844 | 1/1980 | Hubbard et al. . |
| 4,300,699 | 11/1981 | Anhegger . |
| 4,679,698 | 7/1987 | Thorn et al. . |
| 4,690,293 | 9/1987 | Uranishi et al. . |
| 4,714,172 | 12/1987 | Morris ............................. 220/86.2 |
| 4,739,612 | 4/1988 | Stockbridge . |
| 4,836,835 | 6/1989 | Harris et al. ..................... 220/86.2 |
| 4,887,652 | 12/1989 | Bucci ............................... 141/59 |
| 4,917,157 | 4/1990 | Gifford et al. .................... 141/59 |
| 4,932,444 | 6/1990 | Micek ............................... 141/59 |
| 4,944,779 | 7/1990 | Szlaga et al. .................... 220/86.2 |
| 4,946,060 | 8/1990 | Sherwood et al. ............... 220/86.2 |
| 4,955,950 | 9/1990 | Seiichi et al. .................... 141/46 |
| 4,966,299 | 10/1990 | Teets et al. ....................... 220/86.2 |
| 4,977,936 | 12/1990 | Thompson et al. ............... 141/312 |
| 4,995,433 | 2/1991 | Beich et al. ...................... 141/312 |
| 5,027,868 | 7/1991 | Morris et al. .................... 141/59 |
| 5,040,575 | 8/1991 | Oeffling et al. .................. 141/44 |
| 5,056,570 | 10/1991 | Harris et al. ..................... 141/59 |
| 5,071,018 | 12/1991 | Moore .............................. 220/86.2 |
| 5,090,459 | 2/1992 | Aoki et al. ....................... 141/59 |
| 5,111,858 | 5/1992 | Aittama et al. .................. 141/312 |
| 5,186,220 | 2/1993 | Scharrer .......................... 141/59 |

Primary Examiner—Ernest G. Cusick
Attorney, Agent, or Firm—Jerome R. Drouillard; Roger L. May

[57] ABSTRACT

An automotive fuel tank filler pipe contains a two-piece tubular or hollow, opened ended, nested housing in which is fixed an essentially solid disk blocking the opening therethrough and containing a fuel nozzle opening therethrough closed by a spring biased sealing flap door, and including a pair of oppositely acting one-way vacuum-break and pressure relief valves for automatically controlling the pressure conditions in the fuel tank, the structure preventing the unwanted discharge of fuel vapors/liquid into the atmosphere in the event that the fuel cap or closure member normally closing the upper end of the fill pipe is accidentally left off or not replaced or damaged after a refueling operation.

7 Claims, 3 Drawing Sheets

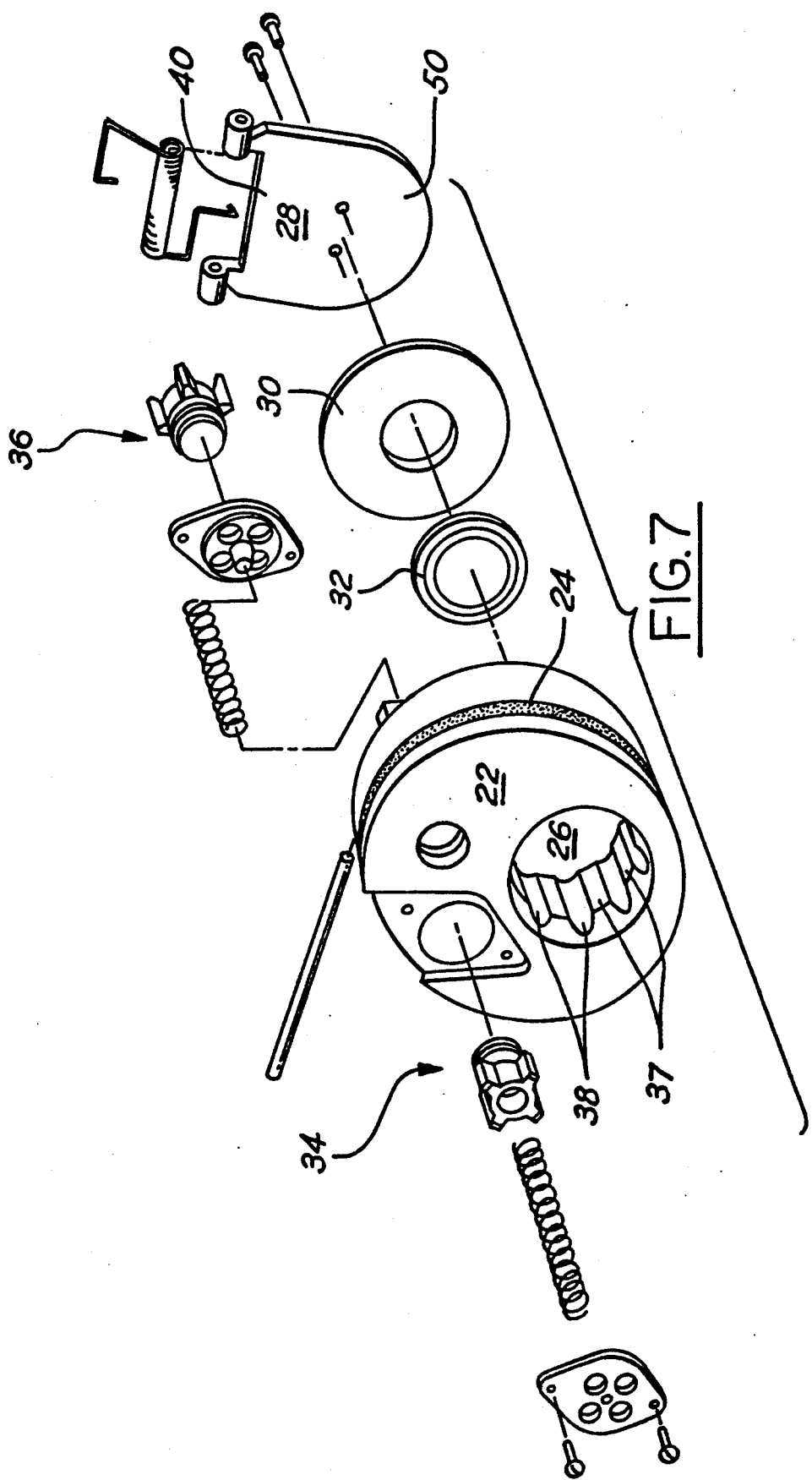

FUEL FILLER PIPE FILL CONTROL MODULE

FIELD OF THE INVENTION

This invention relates in general to automotive type fuel tanks, and more particularly to a module for insertion into the tank fill pipe to control fuel vapor/liquid flow.

BACKGROUND OF THE INVENTION

Most present day passenger car motor vehicles have fuel tanks with filler pipes that contain an insert with an opening only big enough to permit passage therethrough of an unleaded fuel nozzle, with a venting or non-venting cap to sealably close the top of the pipe. A spring-closed flap door normally closes the fuel opening, and generally is of the non-sealing type that merely restricts the flow of leaded fuel by causing a splash-back of the fuel in the event a leaded fuel nozzle is attempted to be inserted.

The disadvantages of the present systems are that if the vehicle operator forgets to replace the cap after refueling, or if the cap is damaged or otherwise loose, the fill pipe is essentially open. This can effect the unwanted discharge of liquid fuel and fuel vapors and pollution of the atmosphere. Without some sort of device, such as, for example, a warning light on the dashboard of the vehicle, the operator would not be aware that the cap is not in place.

This invention is directed to a unitary module that is fixed in place in the fill pipe that, per se, contains all the elements for sealably controlling the flow of liquid/fuel vapors and venting through the fill pipe regardless of whether the closure cap is in place or not. The module, therefore, is a self- containment unit in that it allows all of the functions of filling and venting of the fuel as well as controlling the tank pressures and vacuum conditions.

DESCRIPTION OF THE PRIOR ART

The prior art generally does not address itself to the problem of controlling liquid/vapor discharge out of the fill pipe if the closure cap is either left off, not secured, or damaged. The one instance that does, to be described hereafter, relates to a turbine engine oil storage tank, wherein after refueling, the fill pipe remains open until the engine is started thereby permitting oil vapors to pass back out into the atmosphere.

Turning to the prior art, U.S. Pat. No. 4,690,293 to Uranishi et al. relates to a filler cap structure for closing the filler tube 2. It contains an outer annular seal 8, a lower annular space 7 connected to a carbon canister 6 to vent vapors to the canister, a lower seal 9 that seats against an annular seat 11-A, a side vapor and fuel vent pipe 5 (FIG. 4), and a vacuum break one-way valve 10 in an opening 3d to admit atmospheric air pressure from an ambient air inlet 3c to the tank under certain low pressure tank conditions.

Opening the cap slightly allows fuel vapors to be drawn into the canister prior to removing the cap completely. Excess pressure in the tank causes fuel vapor in the tank to be led to another vent pipe to another canister, not shown, through a further valve mechanism, also not shown.

In FIGS. 6 and 7, the cap contains an inner member 29 slidable vertically against a spring 23 to act as a pressure relief valve by opening the tank to the vent tube 5 leading to the canister. It will be clear that in the event the cap is left off after refueling, the fill pipe is completely open to permit the back flow of liquid fuel and fuel vapors to the atmosphere.

U.S. Pat. No. 4,995,433 to Beicht et al. merely describes and shows a fuel dispenser seal for an automotive fuel tank consisting of a two-piece metal insert for a fuel filler pipe, and a flap door valve, to provide a non-sealed entry for a non-leaded fuel nozzle only. The flap door 10 is merely spring-loaded against the bottom of the insert.

U.S. Pat. No. 4,932,444 to Micek relates specifically to a vapor recovery system for a motor vehicle to contain fuel vapors during filling of the fuel tank. A fill neck assembly is mounted in the inlet of the fuel passage below the cap 14 and contains valving to route the fuel vapors to a remote canister. Removal of the cap permits rod 80 to rise and valve 70 to unseat. Vapors then can pass to a vapor disposal system 100. A ball valve 90 prevents fuel from rising beyond it through passage 58. A pressure relief valve 48 also is provided to permit spill into the cap area. However, it does not prevent loss of fuel/fuel vapors with a cap left off or damaged.

U.S. Pat. No. 4,887,652 to Bucci relates to a system for controlling the discharge of fuel vapors into the atmosphere during refueling. It contains a valve assembly 62 that is closed by the cap threads to permit pressurization of the tank, and opened by lever 72 upon removal of the cap to route all vapors to a vapor capture device. A pressure relief valve 114 (FIG. 14) permits excess fuel to flow out into the fill area 18, to alert the driver of an overfill. In the event that a cap is left off after refueling, the liquid fuel/vapors can escape out through the inlet.

U.S. Pat. No. 4,739,612 to Stockbridge relates to a shuttle valve located in the filler pipe of a turbine engine oil storage tank to retain the fluid in the tank even though the cap may be left off or damaged. An insert 3 contains a piston 8 that is moved down to open the holes 3d to permit filling the tank. Once filled, oil system pressure upon engine start-up forces the piston to rise and seal off the fill holes 3d to prevent an escape of the tank oil. Note that in this reference, there is no opening in the piston for insertion of a fuel nozzle, nor are there other openings to control the pressure conditions in the tank.

U.S. Pat. No. 4,977,936 to Thompson et al. shows in FIG. 5 an insert to the fuel tank fill pipe that contains a seal and a non-sealing flap door 124. The reference is directed primarily to the elastomeric seal insert.

U.S. Pat. No. 4,300,699 to Anhegger shows a fuel tank filler pipe with an insert 4 having a tapered fuel nozzle receiving portion 13, with vent holes 9, and a vent line 6. The nozzle defines an annular air space 8 that conducts air from the tank through holes 9 without allowing fuel to splatter out of the fill pipe neck portion. However failure to replace the closed cap 3 permits the discharge of liquid fuel and vapors out to the atmosphere.

U.S. Pat. No. 4,185,844 to Hubbard et al. shows merely an insert with a non-sealing spring-closed flapper door, and a vapor vent 66 (FIG. 3). It is mainly concerned with the structural material.

U.S. Pat. No. 3,903,942 to Vest relates to a vapor seal member inserted in the neck of a fuel filler tube. It includes a flexible tapered adaptor member 21, with flexible walls forming a seal with or without the fuel nozzle 14 inserted.

U.S. Pat. No. 4,679,698 to Thorn et al. is directed to an insert into the end of an automotive fuel tank filler pipe with a restrictor to prevent the inflow of leaded fuel.

U.S. Pat. No. 3,612,338 to Ekman relates merely to a motor boat fuel tank fill pipe cover, plug, or closure device with a built-in handle or grip that pivots out of a socket.

SUMMARY OF THE INVENTION

The invention is directed to a simple, flat, disk-like module that can be inserted into and fixed into the fuel fill pipe of an automotive fuel tank and be self-contained with respect to all of the necessary valving to control liquid fuel/vapor flow into and out of the fill pipe, as well as pressure and vacuum conditions in the tank, per se, to prevent the unscheduled loss of liquid fuel/vapors to the atmosphere in the event of the failure of the vehicle operator to replace the conventional closure cap after a refueling operation.

The module is sealingly mounted in a two-piece, funnel-like, nested housing that is crimped or brazed together to fix the module in place, and inserted in the upper end of the conventional fill pipe. The module itself has a fuel nozzle opening that is normally closed by a sealing flap door, a one-way vacuum break valve to admit air to the tank under predetermined tank vacuum conditions, and a pressure relief valve to relieve excess tank pressure.

The invention contains in one module all of the necessary functions for preventing the unscheduled escape of fuel vapors/liquid from the fill pipe in the event of failure to replace the closure cap or loss of the same. The prior art does not show such a construction.

Other features, advantages, and objects of the invention will become more apparent upon reference to the succeeding, detailed description thereof, and to the drawings illustrating the preferred embodiment thereof.

BRIEF DESCRIPTION OF THE DRAWINGS

FIG. 7 is an exploded perspective view of the module of FIG. 2.

DESCRIPTION OF THE PREFERRED EMBODIMENT

Figure 1:
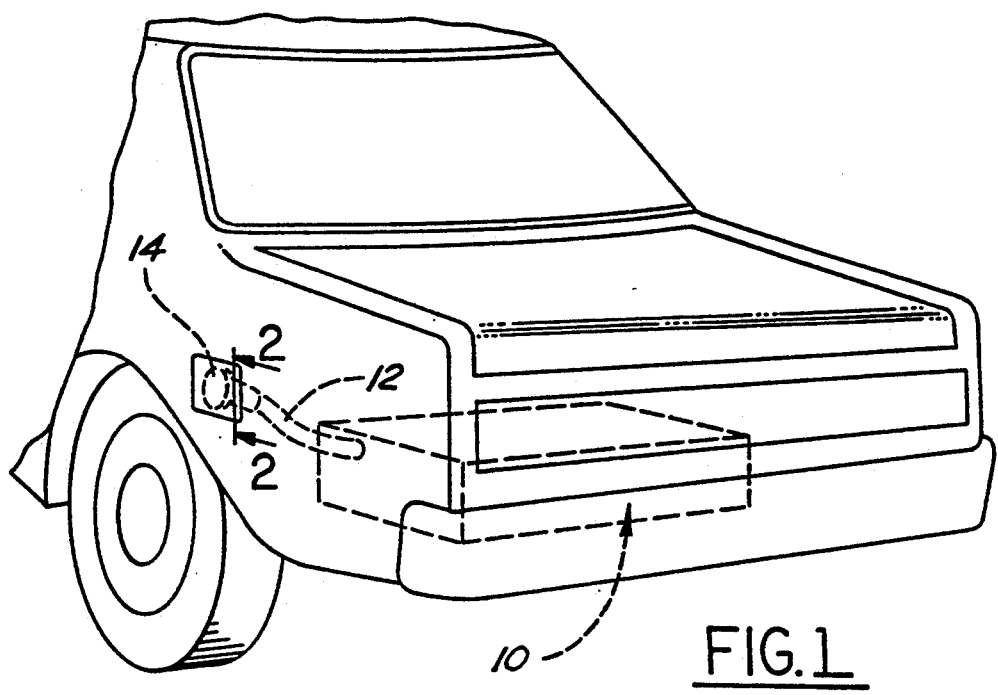
FIG. 1 is an overall perspective view of an automotive fuel tank and fill pipe assembly.
Figure 2:
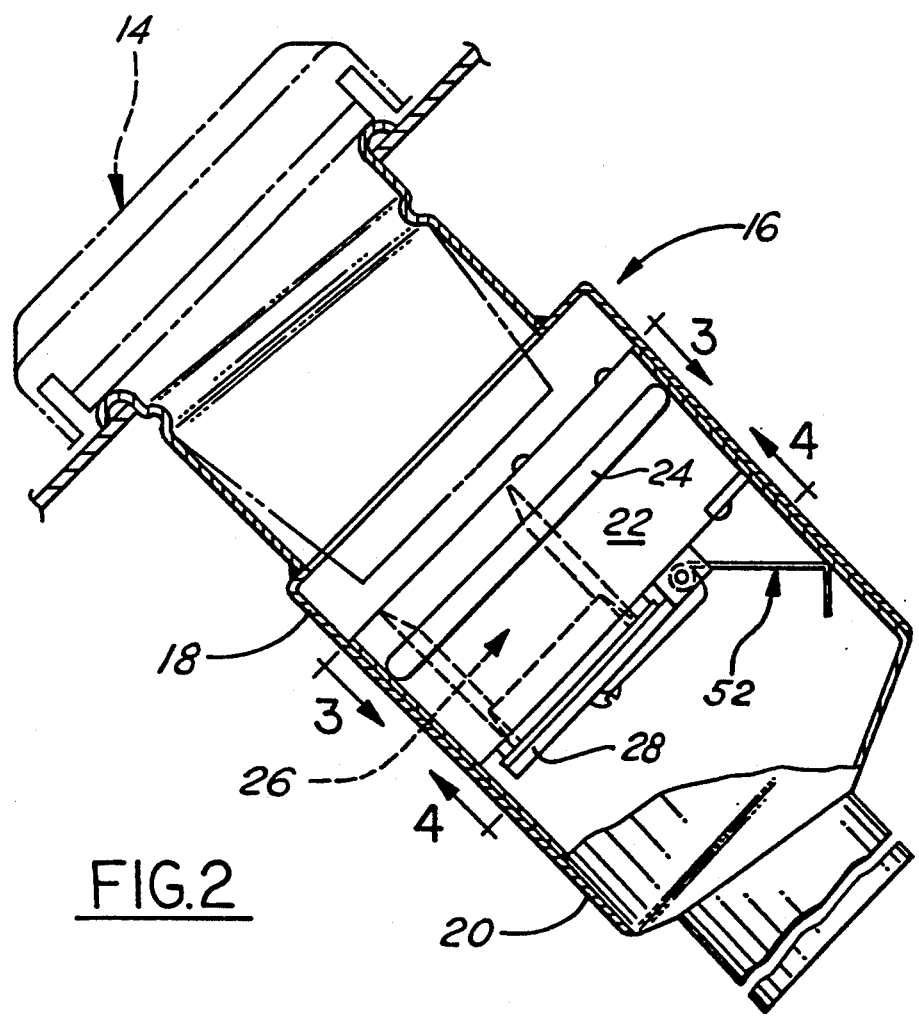
FIG. 2 is an enlarged cross-sectional view taken on a plane indicated by and viewed in the direction of the arrows II—II of FIG. 1.

FIG. 1 shows the rear portion of an automobile having a conventional fuel tank 10 with a filler pipe 12 closed at its top end by a cap 14. As seen in FIG. 2, the upper end of the fill pipe contains a two-piece tubular or hollow housing 16 with open-ended upper and lower steel cups 18 and 20 inverted to face one another and nest in an overlapping manner, as shown. The two portions would be crimped or brazed together once assembled. A cap 14, indicated in dotted lines, would be used to close the upper end of the pipe. It could be of the venting or non-venting type, as desired. It need not seal the upper end.

Sealingly located within the interior of the housing is an essentially solid, flat disk module 22, which could be of plastic or other suitable material. The disk is of a diameter similar to that of the inside diameter of the housing to provide essentially an interference fit between the two, with an annular seal 24 therebetween. Seal 24 prevents fuel vapors/liquid from entering or egressing past the seal. Assembly of the module to the housing would consist of placing the module in one of the cup-shaped portions 18 or 20 through its open end, and then nesting the two portions together in a facing manner, as described previously.

Module 22 contains all of the elements necessary to control fuel vapors/liquid flow and pressure conditions to and from the tank. Referring specifically to FIG. 7, in general, the module contains an opening 26 for insertion therethrough of a conventional unleaded fuel nozzle, a spring-closed flap door 28 biasing a seal 30 and a retainer 32 against the bottom of the fuel nozzle opening 26, and a pair of spring-closed one-way valves 34 and 36 that act in opposite directions as pressure relief and vacuum break valves, respectively.

Turning now specifically to FIGS. 2-6, FIGS. 3 and 5 show the fuel nozzle opening 26 as being formed with a plurality of axially or longitudinally extending ridges 37 and circumferentially spaced grooves 38. The ridges form essentially a close fit with the fuel nozzle that is inserted therethrough during the refueling operation, the grooves 38 serving as passages for the venting of fuel vapors from below the opening during the same refueling procedure.

Figures 3, 4:
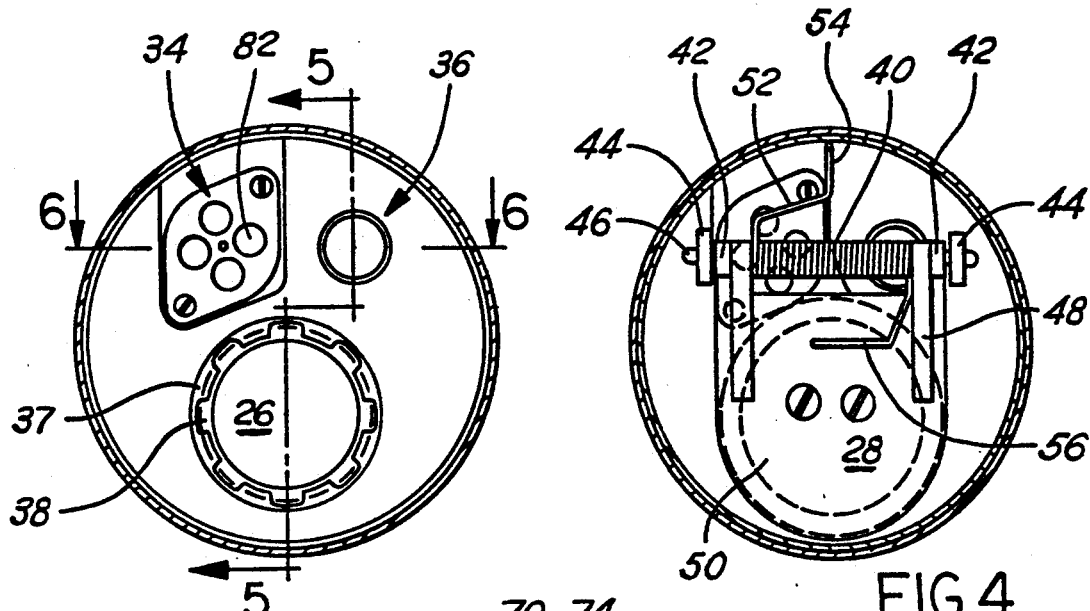
FIGS. 3 and 4, and 5 and 6 are cross-sectional views taken, respectively, on planes indicated by and viewed in the direction of the arrows III—III and IV—IV of FIG. 2, and V—V and VI—VI of FIG. 3.

As seen in FIG. 4, flap door 28 has an essentially rectangular base portion 40 with yoke-like leg portions 42 that are adapted to be aligned with a mating pair of journals 44 fixed to the body of the module 22, the journals receiving therein a pivot pin 46. The flap door has a pair of tapered support bars 48 extending from the base to a rounded end portion 50 that is in diameter slightly larger than the opening 26 for the fuel nozzle. A spring 52 is coiled about shaft 46 with one end 54 abutting against the housing 16 and the other end 56 engaged with the underside of the rounded portion 50 of the flap valve to bias it upwardly to a closed position. Ring seal 30 is located around the stem of a thin T-shaped flanged retainer 32 that is screwed to the flap valve. Its top is abutted against an annular shoulder 60 by the bias of spring 52 to seal the opening 26 when the fuel nozzle is not present.

Figure 5:
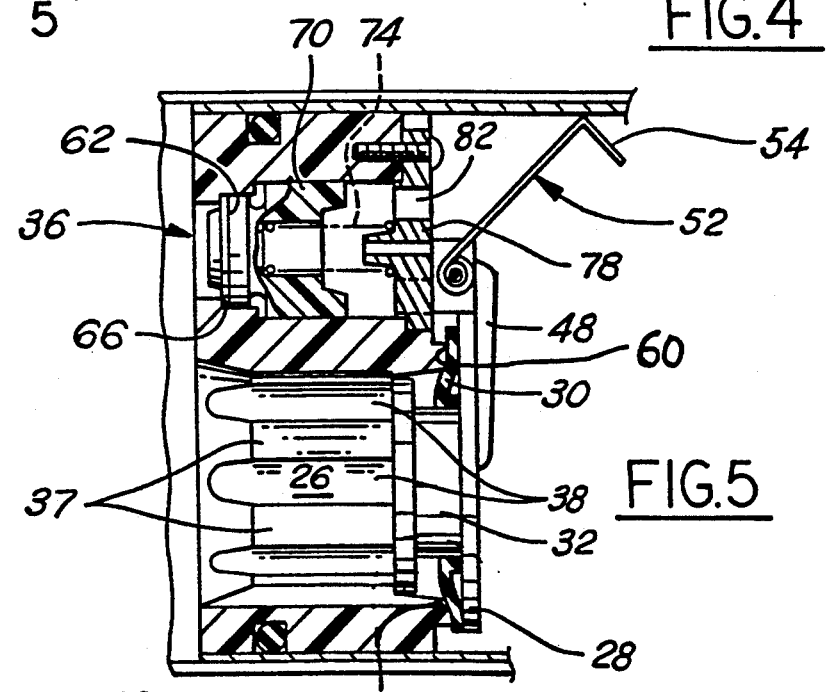
Figure 6:
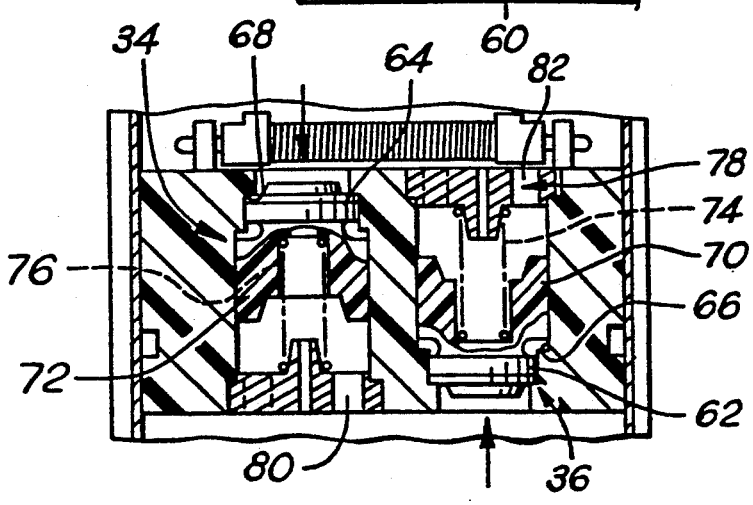

Considering now FIGS. 3, 5, and 6, the module contains the two one-way valves 34 and 36. More particularly, each of the valves is constructed essentially the same. Each contains a valve member 62, 64 adapted to seal against a shoulder 66, 68 provided in the disk body 22. The valve contains a body portion 70, 72 constituting a valve guide and a retainer for one end of a spring 74, 76. The opposite end of each spring is seated against a spring guide 78, 80 attached to the disk body 22, as shown. The body 78, 80, as shown in FIG. 3, is provided with a plurality of holes 82 to allow free flow of fuel and air therethrough, as the case may be.

Most automotive engine vapor control systems include a purge line from the engine to the fuel tank to purge fuel vapors from the tank into a carbon canister and therefrom back into the engine. At times, the canister may be purged of vapors to the point where the vacuum draw on the tank vapors leads to a vacuum level that is larger than scheduled. In this case, the vacuum acting on the bottom (FIG. 5) of the one-way relief valve 36 would permit the higher pressure ambient or atmospheric air to enter through the top of the fill tube and through the open or unseated valve 36 to flow through holes 82 into the tank and thereby raise the pressure in the tank to the setting called for by the spring 74. This provides a so-called vacuum-break feature. This change in vacuum level could occur, for example, were the vehicle to pass through a water puddle that would splash water against the tank and suddenly cool it to a point providing a vacuum condition higher than scheduled or called for. The vacuum break one-way valve would alleviate this condition.

On the other hand, should the pressure in the fuel tank reach a predetermined higher level than that desired, such as, for example, were the contents to be heated for one reason or another, then the higher tank pressure acting against valve 34 would push open the same against the spring 76 and allow the pressure to be reduced to the level called for by spring 76.

In summary, therefore, it will be seen that the invention provides a fuel vapor/liquid containment module that is fixedly located within a two-piece funnel-like housing having a pair of nested cup-like members facing one another, the module containing an opening of a diameter closely receiving an unleaded fuel nozzle therein, with grooves permitting the venting of fuel vapors during the refueling procedure, a sealable flap door that is opened upon insertion of the nozzle through the opening but otherwise seals against the return of fuel vapors/liquid when the fuel nozzle is removed, and a pair of one-way pressure relief valves acting in opposite directions to provide vacuum break and pressure relief features for controlling the various pressure conditions in the tank.

The above construction provides all of the control necessary to prevent the unscheduled discharge of fuel vapor/liquid from the tank filler pipe even through the cap may have come loose or not been replaced by the operator after a refueling procedure. It should also be clear that the cap, per se, could be of the non-sealable type, vented or non-vented as desired, since the entire control functions are provided by the self-containing module 22.

While not described or shown, it will be clear that any fuel vapors/liquid that are vented through grooves 38 during the refueling process, or through the one-way vacuum relief valve 36 at other times, could be directed to a vapor control system containing a canister or the like, without departing from the scope of the invention, so as not to cause an unnecessary discharge of the vapors into the atmosphere.

I claim:

1. An automotive fuel tank fill pipe assembly comprising a multi-piece fill pipe having a first cup-like shaped portion adapted to be connected to a fuel tank, a second mating cup-like shaped portion having its open end facing the first portion and being operably connected thereto, the opposite end of the second portion having means thereon for removably receiving and retaining thereon a closure cap, and a self-contained fuel fill and vapor control module sealingly receivable within the fill pipe for permitting the flow of fuel to the tank while controlling the air and fuel vapors/liquid flow to and from the tank, with said module having a first opening therethrough communicating opposite sides of the module with one another for receiving a fuel nozzle therethrough, a spring-closed flap valve closing the opening and movable to an open position upon insertion of a nozzle thereagainst, the module having second and third openings therethrough containing oppositely acting one-way pressure relief valves therein for admitting air to the tank at times under predetermined tank vacuum conditions and releasing/venting pressure from the tank at other times in response to other predetermined tank pressure conditions, the module preventing the loss of fuel from the tank while maintaining predetermined tank pressure conditions in the event of lack of closure of the fill pipe second portion by the cap.

2. An assembly as in claim 1, the wall portion of the module defining the first opening containing a plurality of longitudinally extending, circumferentially spaced grooves connecting opposite sides of the housing for venting fuel vapors from one side of the module to the other during insertion of the fuel nozzle through the first opening.

3. An assembly as in claim 1, including seal means on the flap valve for sealing the first opening in the closed position of the flap valve.

4. An assembly as in claim 1, including seal means between the module and inner wall of the fill pipe for preventing flow of fuel vapors/liquid therebetween.

5. An assembly as in claim 1, the module comprising a flat disc non-removably positioned in the fill pipe upon assembly of the module to the fill pipe.

6. An assembly as in claim 1, the housing comprising an essentially round plug conforming to the shape of the fill pipe for sealing thereagainst and being non-removably positioned in the fill pipe upon assembly of the module to the fill pipe.

7. A one-piece self-contained fuel vapor/liquid flow control module for sealable insertion into the fill pipe of an automotive fuel tank comprising an essentially solid flat disc of a diameter comparable to that of the fill tube so as to block flow through the same upon insertion thereinto, the disc having a normally closed first opening therethrough for receiving a fuel nozzle therethrough for filling the tank and a plurality of other openings therethrough for controlling pressure conditions in the tank, wherein one of the further openings contains a one-way pressure relief valve for relieving the tank pressure above a predetermined value, and another of the openings contains a one-way vacuum break valve for admitting air into the tank below predetermined tank pressure conditions.

* * * * *